United States Patent
Danzer et al.

(10) Patent No.: US 7,348,093 B2
(45) Date of Patent: *Mar. 25, 2008

(54) FUEL CELL STACK

(75) Inventors: Maximilian Danzer, Scheyern (DE);
Franz-Josef Wetzel, Gernlinden (DE);
Xiaofeng Yan, Leonberg-Warmbronn (DE); Thomas Hoefler, Munich (DE);
Bernd Kuhn, Echterdingen (DE);
Andreas Oswald Stoermer, Tuntenhausen (DE); Olav Finkenwirth, Munich (DE)

(73) Assignee: Bayerische Motoren Werke Aktiengesellscaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/063,579

(22) Filed: Feb. 24, 2005

(65) Prior Publication Data
US 2005/0142426 A1 Jun. 30, 2005

Related U.S. Application Data

(63) Continuation of application No. PCT/EP03/07308, filed on Jul. 8, 2003.

(30) Foreign Application Priority Data
Aug. 24, 2002 (DE) ................ 102 38 859

(51) Int. Cl.
*H01M 8/02* (2006.01)
*H01M 8/04* (2006.01)
*H01M 8/24* (2006.01)

(52) U.S. Cl. ................ 429/38; 429/32; 429/37; 429/39

(58) Field of Classification Search ............ None
See application file for complete search history.

(56) References Cited

U.S. PATENT DOCUMENTS 607,636 A 7/1898 Donnelly (Continued)

FOREIGN PATENT DOCUMENTS

DE 39 35 722 A1 10/1989

(Continued)

*Primary Examiner*—Jonathan Crepeau
*Assistant Examiner*—Robert Hodge
(74) *Attorney, Agent, or Firm*—Crowell & Moring LLP

(57) ABSTRACT

The invention relates to a fuel cell stack which is composed of several individual fuel cells that are stacked on top of each other. Each of said fuel cells comprises a cathode-electrolyte-anode unit (7) and a perforated film (1) which distributes a combustible gas across the first electrode surface thereof, supports the cathode-electrolyte-anode unit (7), and is combined into a cassette (4) that is provided with a hollow space along with an additional structure (3). The combustible gas reaches the first electrode (7A) via said cassette (4). The side of each cassette (4), which is located opposite the cathode-electrolyte-anode unit (7), is provide with a structure for distributing atmospheric oxygen across the surface of the second electrode of a neighboring cassette such that the stack is formed by several superimposed cassettes (4), between the film (1) of which a cathode-electrolyte-anode unit (7) and the structure for distributing atmospheric oxygen across the surface of the second electrode are disposed along with the additional structure (3). In order to brace the individual cassettes against each other in a housing or similar, the inventive stack comprises at least one bracing cassette, the walls of which are impermeable and which is filled with a material that expands to a relatively great extent when being heated.

10 Claims, 2 Drawing Sheets

U.S. PATENT DOCUMENTS

| | | |
|---|---|---|
| 5,770,327 A | 6/1998 | Barnett et al. |
| 6,071,636 A | 6/2000 | Mosdale |
| 2002/0048700 A1* | 4/2002 | Virkar et al. ................. 429/34 |
| 2004/0110054 A1* | 6/2004 | Bourgeois et al. ............ 429/38 |

FOREIGN PATENT DOCUMENTS

| | | |
|---|---|---|
| DE | 43 40 153 C1 | 11/1993 |
| DE | 100 03 528 A1 | 1/2000 |
| DE | 100 12 621 A1 | 3/2000 |
| EP | 0 454 095 A1 | 4/1991 |
| JP | 01076671 | 3/1989 |
| WO | WO 02/33771 A2 | 4/2002 |

* cited by examiner

FUEL CELL STACK

CROSS-REFERENCE TO RELATED APPLICATIONS

This application is a continuation of PCT Application No. PCT/EP2003/007308 filed on Jul. 8, 2003, which claims priority to German Application No. 102 38 859.8 filed Aug. 24, 2002.

The invention relates to a fuel cell stack which includes a plurality of individual fuel cells stacked above one another, each of which has, in addition to a cathode-electrolyte-anode unit, a perforated foil structure which distributes a fuel gas over its first electrode surface.

German Patent Document DE 43 40 153 C1 discloses an example of a generic fuel cell stack of this type.

The use of fuel cells, such as solid oxide fuel cells (SOFC), to generate an electric current is known. Although the amount of electric current which can be obtained in an individual fuel cell depends on the materials used, it is always relatively low. It is therefore necessary to connect several individual fuel cells in electrical series in order to be able to generate a voltage suitable for normal applications. Economical production therefore plays an important role particularly for the large-batch manufacturing of fuel cell stacks. In particular, it should be possible to assemble individual fuel cells to form stacks, with relative ease.

The initially mentioned German Patent Document DE 43 40 153 C1 discloses a fuel cell in which, in addition to an independently prefabricated cathode-electrolyte-anode unit, an independent intermediate layer is provided between the electrodes and the bipolar plates or separating plates (known to a person skilled in the art). This independent intermediate layer is constructed as an electrically conductive, elastic and gas-permeable contact cushion with a deformable surface structure. The cushion filling may be a highly elastic metallic tissue, and the so-called cushion cover may, for example, be a perforated metal sheet. The purpose of this so-called contact cushion is to achieve optimal electrical contact of the electrodes, while allowing a less exact surface quality of (for example) the anodes and cathodes to be tolerated, without adversely affecting electrical contact within the fuel cell or fuel cell stack.

However, the assembly of the individual elements of this known fuel cell stack is costly.

Therefore, one object of the invention is to provide a fuel cell stack which can be assembled with relative ease.

This and other objects and advantages are achieved by the fuel cell stack according to the invention, in which a perforated foil (having holes or passage openings) carries the cathode-electrolyte-anode unit and is combined with another structure to form an enclosure which defines a cavity, through which enclosure fuel gas reaches the first electrode. In an area situated opposite the cathode-electrolyte-anode unit, each enclosure is provided with a configuration for distributing air-oxygen over the surface of the second electrode of an adjacent enclosure in a stack formed by several enclosures arranged above one another. A cathode-electrolyte-anode unit is situated in each case between adjacent enclosures, as well as a configuration for distributing air oxygen over the surface of the second electrode.

According to the invention, each individual fuel cell of the fuel cell stack represents a complete unit which can be handled separately. In addition to the fuel gas feed (and removal) by way of the enclosure according to the invention, this unit also contains a suitable "additional" structure for distributing the air-oxygen. To satisfy the "tightness" requirements, feeding of the fuel gas takes place via the respective enclosure; and, for the same reason, the first electrode of the cathode-electrolyte-anode unit to be brought in contact with the fuel gas is also provided directly on the respective enclosure. With respect to the air feed or oxygen feed to the other (second) electrode of the cathode-electrolyte-anode unit on the respective enclosure, only a suitable "further" structure for distributing air-oxygen is provided, while such other electrode is a component of the adjacent enclosure or of the cathode-electrolyte-anode unit provided on the latter.

It is assumed, for example, that a cathode-electrolyte-anode unit (abbreviated CEA) is situated on the top side of a first enclosure, with the anode of the CEA resting directly on the foil of the enclosure. It is then assumed that the above-mentioned configuration for distributing air-oxygen over the cathode of the second enclosure arranged below this enclosure is situated on the bottom of this enclosure, with the cathode-electrolyte-anode unit (CEA) of the second enclosure facing the bottom side of the first enclosure. Considering only these two enclosures, the following construction will then be obtained viewed in the downward direction:

(CEA of the 1st enclosure)
(foil and further structure of the 1st enclosure)
(configuration on the 1st enclosure for distributing air oxygen for the 2nd enclosure)
(CEA of the 2nd enclosure)
(foil and further structure of the 2nd enclosure)
(configuration on the 2nd enclosure for distributing air-oxygen on the 3rd enclosure).

This series can be continued arbitrarily.

The perforated foil, which is a component of the enclosure according to the invention, and which carries a cathode-electrolyte-anode unit, is also responsible for the distribution of the fuel gas over the surface of the first electrode of this unit. Preferably, it consists of a metallic material, as does the so-called further structure, and thus—with the exception of the cathode-electrolyte-anode unit, the entire enclosure, specifically for the following reason:

If the material used for the substrate or the like (the above-mentioned foil) carrying the cathode-electrolyte-anode unit of a fuel cell is different than that which is used for the conventional bipolar plate known to the person skilled in the fuel cell art, it is nearly impossible to weld these two components together, or at least they can be welded together only poorly. Such welding, however, represents a connecting technique endeavored for an industrial large-batch production. In the presence of environmentally or operationally caused temperature changes, the coefficients of thermal expansion, which deviate from one another when different materials are used, lead to thermomechanical tension within the fuel cell, particularly between the carrier substrate (that is, the above-mentioned foil) and the anode disposed thereon, but also within the cathode-electrolyte-anode unit between the anode and the electrolyte layer as well as between the electrolyte layer and the cathode. As a result, the fuel cell is exposed to stress which can reduce its durability, and should therefore be avoided. Particularly when the preferably ferritic bipolar plates are welded together, for example, with nickel-containing substrates, the ferrite of the bipolar plate material along the weld seam may be considerably austenitized by remelting/realloying processes. Thermal expansion which, as a result, rises considerably in the environment of the ceramic cathode-electrolyte-anode unit (even when the ferrite is well adapted expansion-specifically to the anode), may lead to a chipping-off of components of the cathode-electrolyte-anode unit, and thus to failure of the ceramic fuel cells.

This problem can only be solved by making the above-mentioned perforated foil (or a corresponding metal sheet or strip) of a suitable metallic material, and assembling it with a so-called additional structure (also consisting of a metallic material) to form an enclosure having a cavity. The assembled configuration thus finally forms a bipolar plate of an individual fuel cell, on whose perforated foil, the cathode-electrolyte-anode unit is situated.

The above-mentioned cavity of the enclosure can guide the fuel gas to and from the electrode (for example, the anode).

The enclosure thus comprises a hollow body, preferably consisting of a top shell and a bottom shell which are welded together along their edges, generally connected in a material-locking manner in order to ensure a sufficient gastightness in this area. When several such enclosures are stacked, with each having a cathode-electrolyte-anode unit on its top shell, they form a basically known fuel cell stack. (The assembled top shell and bottom shell operate as a bipolar plate which guides fuel gas to the anode layer.) Care should be taken that a gas distribution space or flow space for the ambient air (or air-oxygen) is present between the exterior side of the bottom shell of a first enclosure and the top electrode layer of the second enclosure that is situated under the first enclosure in the fuel cell stack.

The exterior side of the bottom shell can be provided with a corresponding embossed structure, which creates such a flow space in the form of essentially a channel, that is suitable for distributing air-oxygen. For example, in or transversely to the flow direction, the corresponding embossings can have a meandering structure, interrupted and laterally offset channels, an inflow zone and much more. As an alternative or in addition, a metallic wire knit or the like applied to this wall can form this suitable configuration for distributing air-oxygen. (The term "wire knit" is a general term for a knit, tissue or nonwoven and much more, which can be characterized by a comparable construction, the wire knit preferably being welded or soldered to the so-called bottom shell of the enclosure.) A good electrical connection should also be established in this case between the enclosure and the knit, in order to minimize ohmic resistances in the fuel cell stack.

For the sake of completeness, it should be pointed out that a connection between the perforated foil and the cathode-electrolyte-anode unit mounted thereon can have different constructions. In a preferred embodiment, the individual layers of this cathode-electrolyte-anode unit (CEA) are applied to the perforated foil, successively by a thermal powder spraying method.

Two basic embodiments are possible for the enclosure and for the machining process according to the invention. According to a first variant, a preferably previously perforated foil can be welded as the substrate into a so-called top shell of the enclosure, which may have a rectangular, square, round or arbitrarily oval cutout. For this purpose, a corresponding foil, strip or metal sheet is first perforated (that is, is provided with suitable holes or passage openings), which basically can take place either in a strip, or piece by piece. The foil is then welded into a corresponding cutout of the top shell of a fuel cell enclosure to be produced. Such a weld seam replaces the sealing-in of the fuel cell in its bipolar plate by means of a glass solder or other ceramic or metallic glue, which is normally essential in the case of a planar solid-oxide fuel cell.

Subsequently, according to an advantageous manufacturing method, the cathode-electrolyte-anode unit can be sprayed directly onto the welded perforated metal foil, using a thermal powder spraying method. For example, a vacuum plasma, atmospheric, flame or other spraying method can be used for this purpose. In this case, using a spraying mask, the anode is preferably sprayed on almost to the weld seam between the foil and the top shell. Subsequently, by means of a larger mask, the electrolyte layer can be applied to the anode layer, whereby the latter can be made gastight and can be electrically insulated. In addition, the weld seam and a small edge of the metal sheet situated around it can be sealed off by spraying by means of electrolyte material in the same operation. The cathode layer can then be applied by spraying exactly onto the surface of the anode, using the mask.

According to a second embodiment, the top shell can be used directly as the carrier substrate for the anode layer to be sprayed on, in which case it has no recess. Instead, in the area of the anode to be applied later by a thermal powder spraying method, the enclosure top shell itself is perforated to form the perforated foil according to the invention. Such perforation can be performed either before or after the top and bottom enclosure halves are welded together. The cathode-electrolyte-anode unit is then applied as described for the first embodiment; however, in this case, the sealing function of the electrolyte is limited to the sealing-off of the porous anode layer.

In addition, a suitable coarse structure can be placed in the cavity of a described so-called fuel cell enclosure in a fuel cell stack, to improve the fuel gas distribution. This coarse structure may be a wire knit, a wire mesh, a wire netting or a nonwoven (referred to generically herein as a wire knit). This knit can also be used for the mechanical support of the top shell on the bottom shell as well as for conducting electric current.

In fuel cell stacks, it is particularly problematic to ensure a sufficient electric contact among the mutually adjacent fuel cells of the stack, in order to minimize ohmic losses in the stack. A special problem in this regard is that the fuel cell stack is subject to large temperature fluctuations, specifically between the maximal operating temperature, on the one hand, and a stoppage temperature under ambient conditions, on the other hand, which results in unavoidable thermal expansions. If a sufficient electric contact between the individual stacked fuel cells of a fuel cell stack is to be ensured under any condition, such thermal expansions must be compensated appropriately. For this purpose, the individual fuel cells arranged above one another in a suitable housing can be braced with respect to one another, for example, by means of a spring element; this structure may, however, result in excessive mechanical stress to the ceramic electrode layers.

In contrast, as also suggested, it is much more advantageous for the stack of individual fuel cells arranged in a housing or the like to contain at least one so-called bracing enclosure, whose walls have an impermeable construction and which is filled with a material that expands relatively significantly when heated. With respect to its dimensions, this so-called bracing enclosure is preferably similar to the other enclosures in each case assigned to a cathode-electrolyte anode unit. Naturally, the bracing enclosure itself should also be current-conducting so that the desired current flow within the stack will not be interrupted.

Because of the above-mentioned geometric similarity, such a bracing enclosure fits optimally into a stack of individual fuel cell enclosures according to the invention. As a result, virtually an automatic bracing is obtained within the fuel cell stack as a function of the existing temperature. For example, at ambient temperatures, the individual fuel cells with their enclosures, including at least one bracing enclosure situated in the stack, would be sufficiently braced with respect to one another in order to ensure optimum current flow within the stack. During startup of the fuel cell, the temperature rises intensively so that housing or the like accommodating the individual enclosures (which should be electrically insulated with respect to the enclosures) expands. In this case, if it is appropriately designed, the bracing enclosure can expand essentially to the same extent so that, irrespective of the occurring thermal expansions, the prestressing in the fuel cell stack is maintained. The corresponding expansion of the bracing enclosure(s) takes place independently as a function of the respective temperature rise because this enclosure is filled with a suitable material which expands (preferably relatively significantly) when heated. For example, this material may be water; however, in addition, a large number of other materials can also be found.

Other objects, advantages and novel features of the present invention will become apparent from the following detailed description of the invention when considered in conjunction with the accompanying drawings.

DETAILED DESCRIPTION OF THE DRAWINGS

Figure 1:
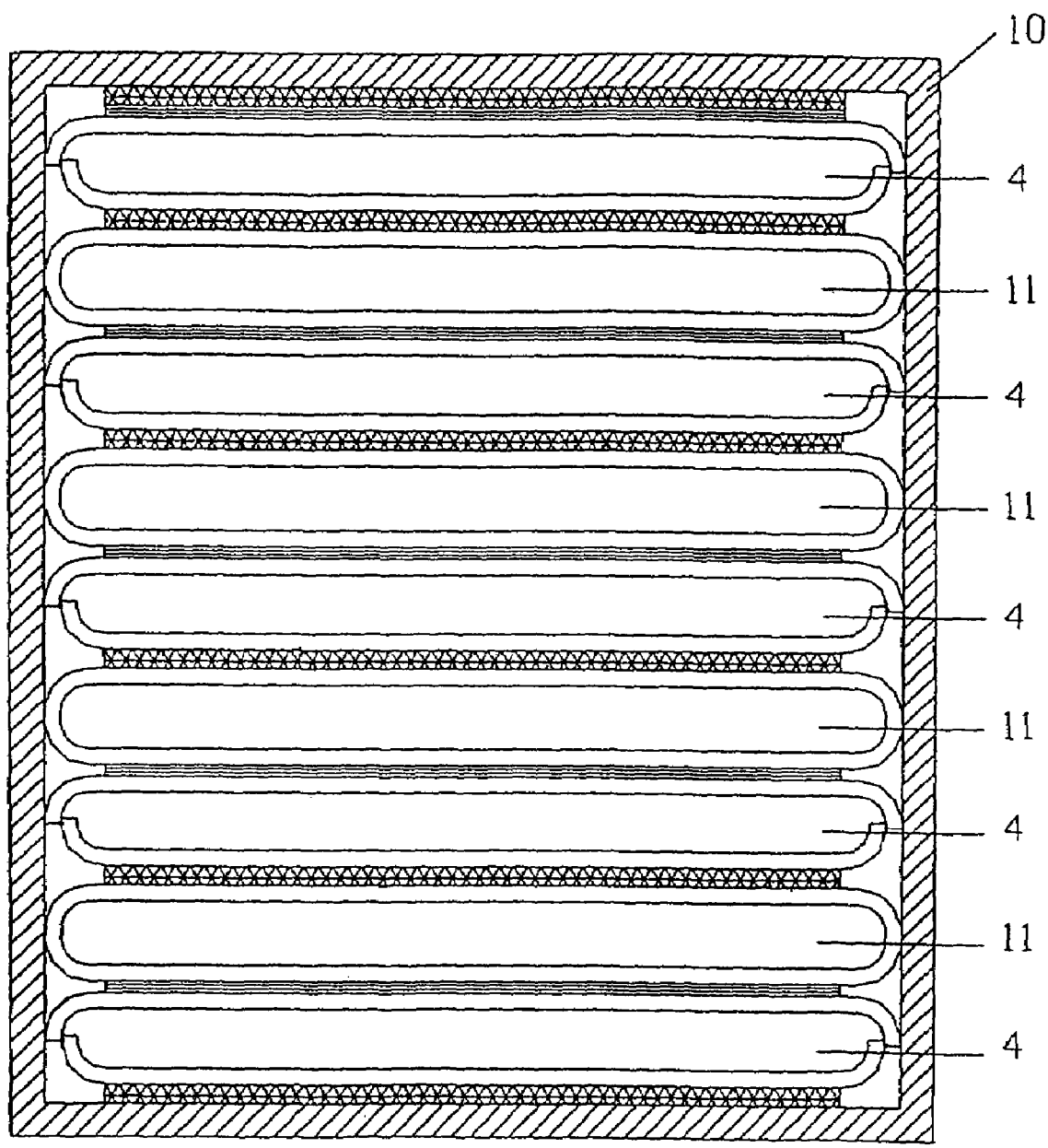
FIG. 1 is a schematic view of a fuel cell stack with an above-described bracing enclosure.

In FIG. 1, reference number 10 indicates a housing which is essentially closed on all sides and in which several enclosures 4 (which form individual fuel cells) are arranged in a stacked or clamped-in manner. The stack also includes several bracing enclosures 11 which, analogously to the enclosures 4 to be explained in detail below, are bodies forming a cavity. The cavity of each bracing enclosure 11 is filled with a suitable material which expands relatively significantly during a rise in temperature. As described previously, the bracing enclosures 11 ensure that the enclosures 4, 11, which are arranged vertically one above another and are therefore mutually braced in the vertical direction, remain braced, even during extreme temperature changes in the fuel cell stack.

Numerous additional elements are of course required on a fuel cell stack, such as feed and removal lines for the fuel gas as well as for the ambient air supplying the necessary oxygen, diverse electrical connections, etc. However, these details are unimportant for understanding the essence of the present invention. It is only pointed out that the housing 10 should of course not produce an electric short-circuit between the individual enclosures 4, 11 and, for this reason, should either be made of an electrically insulating material or provided at least on the interior side with a suitable electric insulation layer.

Figure 2:
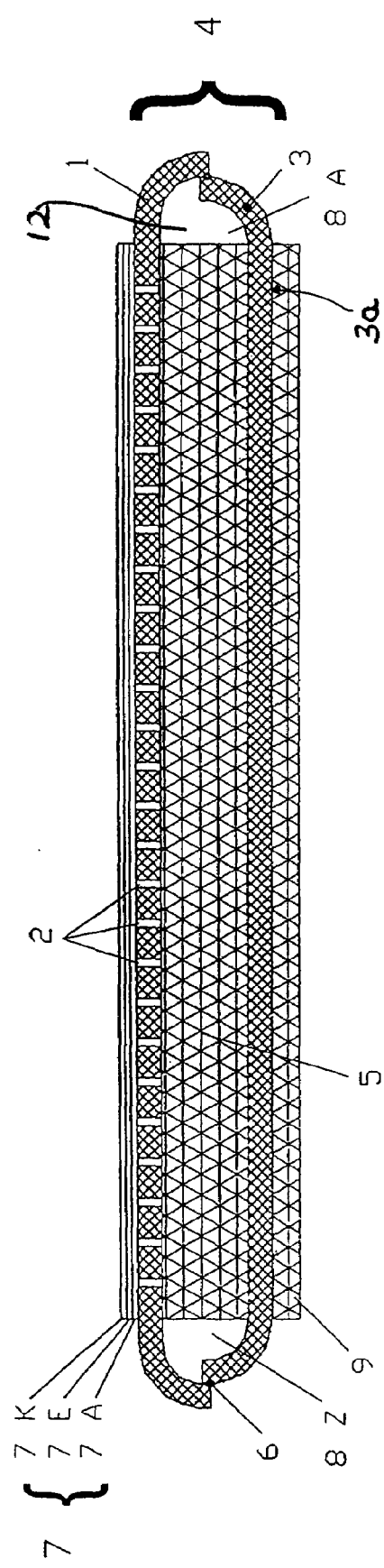
FIG. 2 is a sectional view of an individual fuel cell in the form of an enclosure according to the invention.

FIG. 2 is a simplified illustration of an individual fuel cell in the form of an enclosure according to the invention. Reference number 1 indicates a metallic foil, which is perforated by holes or passage openings 2, and which also forms the top shell of the enclosure 4. As illustrated, the foil 1, extends perpendicularly to the plane of the drawing.

Together with a further structure (bottom shell) 3, the foil top shell 1 forms the above-mentioned enclosure 4, which defines a cavity 12. A metallic wire knit 5 or the like is inserted into a partial area of this cavity, specifically essentially in the area adjacent with the holes 2. The edges of the top shell and bottom shells 1, 3 are welded together in a material-locking manner, by a surrounding weld seam 6, and therefore gastightly connected with one another.

Essentially in the area with the wire knit 5, a cathode-electrolyte-anode unit 7 is applied to the side of the top shell 1 facing away from the wire knit 5, the layer resting on the foil 1 being the anode layer 7A. The latter is applied in the manufacturing process of an enclosure 4 or an individual fuel cell as a first layer by means of a thermal powder spraying method (preferably by vacuum plasma spraying). As explained above, an electrolyte layer 7E is then applied thereto, and a cathode layer 7K is then applied to the electrolyte layer 7E.

The fuel gas required for the fuel cell or for the electrochemical conversion process which takes place there is fed into the cavity of the enclosure 4, via a fuel gas feed 8Z situated in the area of the cavity on the left side in the drawing, while fuel gas removal 8A is situated in the section of the enclosure cavity which is on the right side. Through the wire knit 5, this fuel gas is appropriately distributed to the individual holes 2, 2', so that it can arrive at the anode layer 7A, and react there correspondingly. The reaction products are also removed via the holes 2, toward the fuel gas removal 8A.

So that the desired electrochemical reaction can take place on the cathode-electrolyte-anode unit 7, it is also necessary to admit oxygen to the cathode 7K. For this purpose, a certain clearance must be maintained when several individual fuel cells are stacked above one another in a conventional manner, in the shape of the illustrated enclosure 4. Thus, the exterior side 3a (or, in the figure, the underside) of the bottom shell 3 is provided with a corresponding embossed structure creating such a clearance. As an alternative—as illustrated in the figure—a suitable wire knit 9 or the like can be mounted (for example, soldered) on the underside 3a of the bottom shell 3. Through the above-mentioned embossings or through this wire knit 9, air-oxygen can reach the cathode (7K) of an individual fuel cell stack, as shown in FIG. 1, below the individual fuel cell or enclosure 4 illustrated in the figure. A combination of both measures is also possible.

As known, the individual fuel cells arranged above one another in a fuel cell stack are to be mutually connected in an electrically easily conductive manner in order to minimize the ohmic losses in this stack. In this sense, the above-mentioned metallic wire knit 9 is also particularly advantageous. Also in this sense, the two (top and bottom) enclosure shells should be mutually well contacted electrically. This can take place by means of the above-mentioned weld seam 6, which, for this purpose, can extend in the concerned surface along a meandering path, and/or additionally by way of metallic wire knits contacted electrically on the top shell 1 and the bottom shell 3, such as the wire knit 5 provided here in the cavity of the enclosure 4. Such contact can be provided by resistance welding (seam welding, spot welding, capacitor discharge welding), laser welding, electron beam welding or soldering. In this context, reference is again briefly made to FIG. 1 with respect to the fact that the housing 10 accommodating the several mutually stacked enclosures 4 should be electrically insulated with respect to these enclosures 4, to avoid an electric short circuit.

A fuel cell stack assembled from enclosures 4 or individual fuel cells of this type can be manufactured in a very simple manner, including in a large-batch series. The enclosure according to the invention is distinguished by a relatively slight distortion (in the course of the significantly varying operating temperatures), resulting in an improvement of the operating condition for the seal (not illustrated in the figures but necessary in a fuel cell stack). The evenness of the application surface for the anode layer 7A, which is considerably improved as a result of the use of the foil 1, permits the reaction of smaller thicknesses of the ceramic reaction layers (that is, the cathode-electrolyte-anode unit 7), and thus a lower consumption of material as well as lower reaction losses because of shorter transport paths. Also with respect to the contact layer to the cathode 7K, which is implemented here by the wire knit 9, lower ohmic losses and lower transport resistances will then be obtained. On the whole, due to improved electrical transverse and longitudinal conductance of the so-called substrate (that is, the foil), the chemical processes in the fuel cell can be improved and the ohmic losses in the enclosure 4 can be reduced.

It is also noteworthy that a (transverse) electric contact of the top shell 1 with the bottom shell 3 is not necessary in the area of the cathode-electrolyte-anode unit 7 because, the current flow in this individual fuel cell can just as easily take place laterally by way of the top shell 1 and the edge weld seam 6 to the bottom shell 3, so that the wire knit 5 illustrated in the cavity of the enclosure 4 in the figure can optionally be left out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell stack, comprising a plurality of individual fuel cells stacked above one another, wherein:
    each fuel cell comprises a cathode-electrolyte-anode unit applied over a surface of a first structural element which distributes fuel gas over a first electrode surface in said cathode-electrolyte-anode unit;
    said first structural element faces the first electrode surface and is formed by a perforated foil which is perforated by a plurality of holes;
    said first structural element is gas-tightly joined with a second structural element to form an enclosure which defines a cavity that is bounded by said first and second structural elements;
    the fuel gas flows through said cavity and said holes to and from the first electrode surface;
    on an exterior surface opposite the cathode-electrolyte-anode unit, said enclosure has a distribution configuration for distributing an oxidizing gas over a surface of a second electrode of an adjacent enclosure, so that the stack is formed by a plurality of enclosures arranged above one another, with a cathode-electrolyte-anode unit and said distribution configuration situated between the foil and further structure of adjacent enclosures in said stack.

2. The fuel cell stack according to claim 1, wherein the distribution configuration is formed by one of (i) a channel structure formed in a wall of the enclosure situated opposite the cathode-electrolyte-anode unit, and (ii) a metallic wire knit mounted on said wall.

3. The fuel cell stack according to claim 1, wherein:
    individual enclosures are braced with respect to one another in a housing; and
    the stack contains at least one bracing enclosure whose walls have an impermeable construction and which is filled with a material that expands substantially when heated.

4. The fuel cell stack according to claim 3, wherein dimensions of the bracing enclosures are similar to dimensions of other enclosures in the stack, each provided with a cathode-electrolyte-anode unit.

5. The fuel cell stack according to claim 4, wherein said first and second structural elements are formed by top and bottom shells, respectively, which are material-lockingly connected with each other, in a gastight manner.

6. The fuel cell stack according to claim 5, wherein the enclosures are welded together.

7. The fuel cell stack according to claim 5, wherein at least one of the cavity of the enclosures and the bracing enclosure is filled with a wire knit.

8. A fuel cell stack comprising a plurality of individual fuel cell units arranged in a stacked configuration, wherein each of said fuel cell units comprises:
    a concave top shell;
    a concave bottom shell which is gas-tightly joined to said top shell and, together with said top shell, forms an enclosed cavity which is delimited by said top and bottom shells;
    a cathode-electrolyte-anode unit applied over an exterior side of said top shell;
    means for distributing a fuel gas to said cavity and for removing reacted gases from said cavity, wherein:
    said top shell has a plurality of perforations therein, said perforations providing a path for passage of fuel gas from said cavity, to and from said cathode-electrolyte-anode unit; and
    an exterior surface of said bottom shell has a structure which accommodates flow of an oxidizing gas over an adjacent surface of a cathode-electrolyte-anode unit on an upper shell of an adjacent fuel cell unit in said stack.

9. The fuel cell stack according to claim 8, wherein said top shell is made of a perforated metallic foil, and said bottom shell is made of a metallic foil material.

10. The fuel cell stack according to claim 9, wherein said surface structure of said bottom shell comprises one of an embossed structure which provides gas flow channels therein and a metallic wire knit applied to said on exterior surface of said bottom shell.

* * * * *